US010645598B2

(12) United States Patent
Arjun et al.

(10) Patent No.: US 10,645,598 B2
(45) Date of Patent: May 5, 2020

(54) UPGRADE CONTROLLERS AND ACCESS POINTS BY GROUP

(71) Applicant: HEWLETT PACKARD ENTERPRISE DEVELOPMENT LP, Houston, TX (US)

(72) Inventors: Vinod Arjun, Bangalore (IN); Jiwoong Lee, Sunnyvale, CA (US); Sachin Ganu, San Jose, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/334,140

(22) Filed: Oct. 25, 2016

(65) Prior Publication Data

US 2018/0115918 A1    Apr. 26, 2018

(51) Int. Cl.
*H04W 24/04*      (2009.01)
*H04L 12/24*      (2006.01)
*H04W 84/12*      (2009.01)

(52) U.S. Cl.
CPC ......... *H04W 24/04* (2013.01); *H04L 41/0672* (2013.01); *H04L 41/082* (2013.01); *H04L 41/0893* (2013.01); *H04W 84/12* (2013.01)

(58) Field of Classification Search
CPC ..... H04W 24/02; H04W 24/04; H04W 84/12; H04W 88/08; H04L 41/0672; H04L 41/082; H04L 41/0893; H04L 45/50; G06F 8/65; G06F 8/654; G06F 8/656; G06F 8/658
See application file for complete search history.

(56) References Cited

U.S. PATENT DOCUMENTS

| 2005/0208944 | A1  | 9/2005 | Okita et al. | |
|---|---|---|---|---|
| 2008/0084855 | A1* | 4/2008 | Rahman | H04L 67/34 370/342 |
| 2009/0216345 | A1* | 8/2009 | Christfort | G05B 19/0428 700/21 |
| 2010/0217845 | A1* | 8/2010 | Doshi | G06F 8/67 709/221 |
| 2011/0105138 | A1* | 5/2011 | Morimoto | H04W 28/16 455/452.2 |
| 2011/0122788 | A1* | 5/2011 | Sombrutzki | H04W 16/10 370/252 |

(Continued)

FOREIGN PATENT DOCUMENTS

| EP | 2651158 | 10/2013 |
|---|---|---|
| EP | 3002906 | 4/2016 |

*Primary Examiner* — Habte Mered
*Assistant Examiner* — Prince A Mensah
(74) *Attorney, Agent, or Firm* — Brooks, Cameron & Huebsch, PLLC

(57) ABSTRACT

Example implementations relate to upgrading controllers and access points by group. A master controller may comprise a processing resource and a memory resource storing machine-readable instructions to cause the processing resource to create a plurality of groups of access points (APs) connected to a first and a second local controller, move a subset of the plurality of APs connected to the first local controller to the second local controller, upgrade the first local controller, move APs associated with a group of the plurality of APs to the first local controller, and upgrade the APs associated with the group of the first local controller.

15 Claims, 5 Drawing Sheets

(56) References Cited

U.S. PATENT DOCUMENTS

| | | | |
|---|---|---|---|
| 2013/0343178 A1* | 12/2013 | Ankaiah | H04W 24/04 370/221 |
| 2014/0376362 A1* | 12/2014 | Selvaraj | H04L 41/082 370/221 |
| 2015/0016438 A1* | 1/2015 | Harel | H04W 74/0816 370/338 |
| 2015/0049632 A1* | 2/2015 | Padmanabhan | H04L 67/34 370/254 |
| 2015/0237002 A1* | 8/2015 | Baniqued | H04L 61/2007 709/220 |
| 2015/0312820 A1 | 10/2015 | Yang | |

* cited by examiner

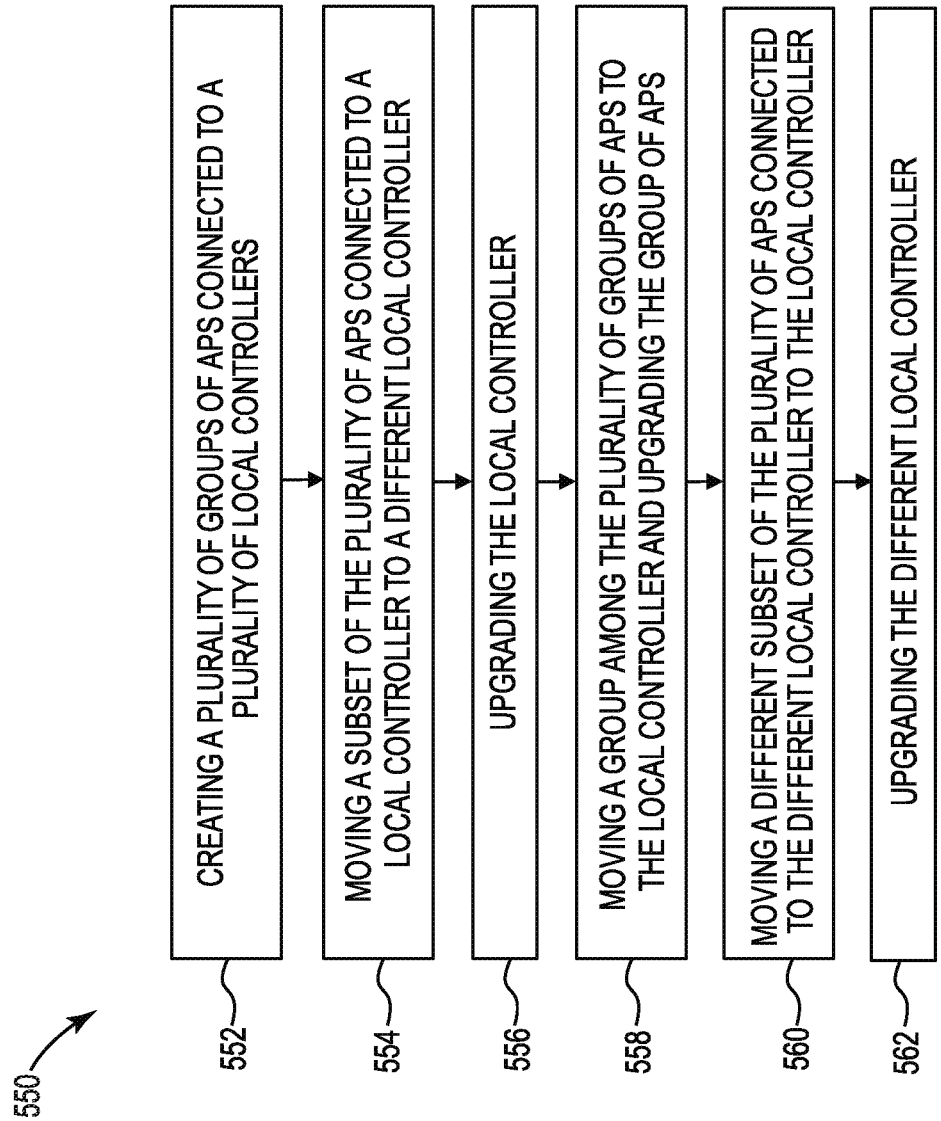

UPGRADE CONTROLLERS AND ACCESS POINTS BY GROUP

BACKGROUND

In some computing networks, access points (APs) may provide network connectivity to client devices. These APs may be associated with controllers. The APs and the controllers may work in coalition to provide redundancy in an event that one of the APs and/or one of the controllers fails. For example, if one controller or AP fails, another controller or AP may provide network connectivity to a client device so that the client device does not experience an interruption in network connectivity.

BRIEF DESCRIPTION OF THE DRAWINGS

FIG. 5 illustrates an example method, consistent with the present disclosure.

DETAILED DESCRIPTION

Upgrading controllers and/or APs in a computing network may involve a scheduling a maintenance window for upgrades to a controller and/or AP instructions. The maintenance window may involve a network connectivity outage for client devices. This outage may last for several minutes to hours, keeping client devices from accessing the computing network.

Upgrading controllers and access points by group according to the disclosure allows for upgrades of controller and/or AP instructions without interruption in wireless service to client devices connected to the wireless LAN. As a result, upgrading controllers and/or APs by group may provide network connectivity to client devices without impacting client device network traffic and avoiding network outages.

Figure 1:
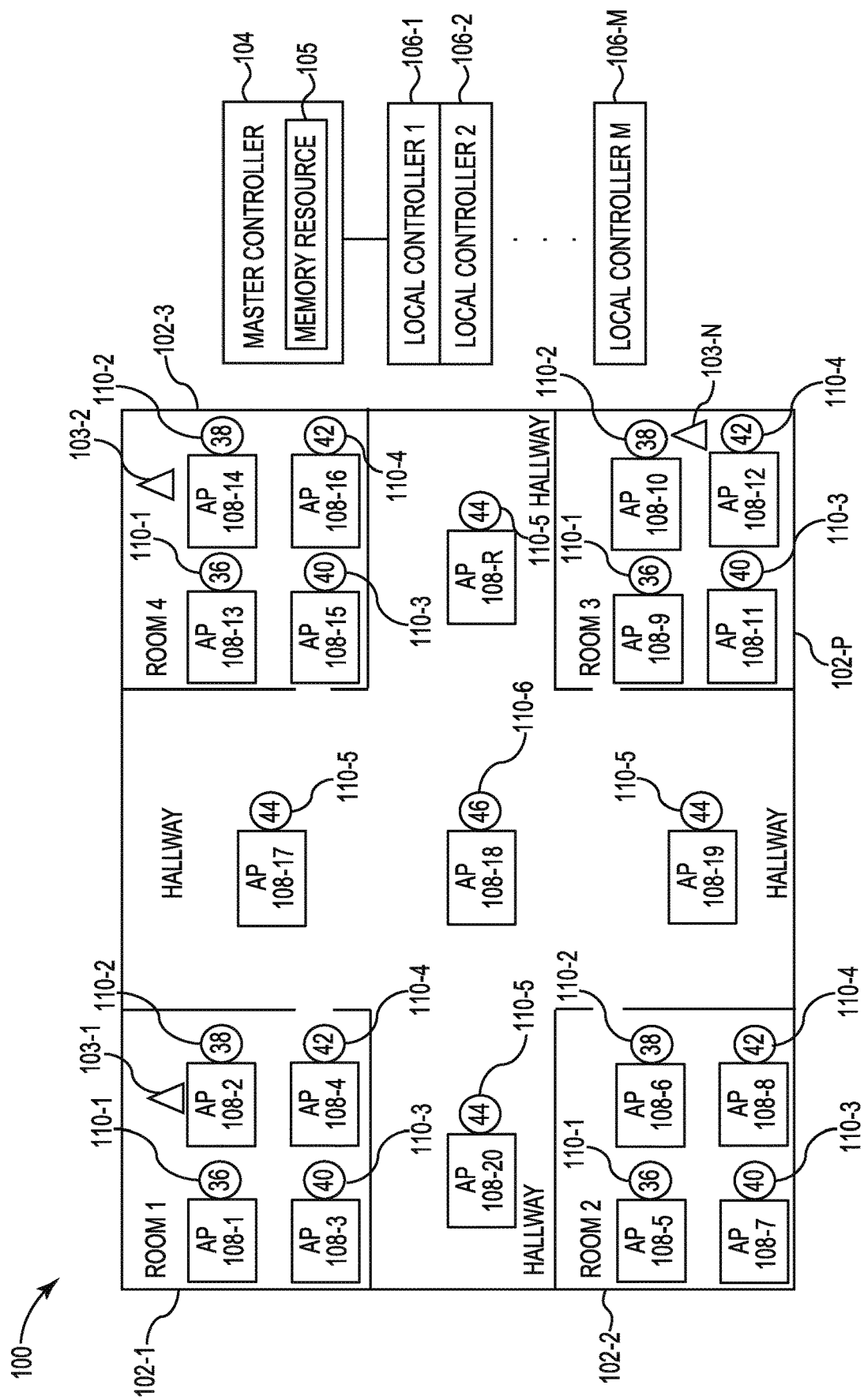
FIG. 1 illustrates an example network layout consistent with the present disclosure.

FIG. 1 illustrates an example network layout 100 consistent with the present disclosure. As illustrated in FIG. 1, the network layout 100 may include rooms 102-1, 102-2, 102-3, 102-P and connecting hallways. Rooms 102-1, 102-2, 102-3, 102-P and hallways may include APs, such as AP 108-1 through AP 108-R, which provide network access to client devices 103-1, 103-2, 103-N via a plurality of AP channels 110-1, 110-2, 110-3, 110-4, 110-5, 110-6. For example, client device 103-1 may be located in room 102-1 (e.g., Room 1). Client device 103-1 may be connected to AP 108-1. AP 108-1 may be associated with a local controller 106-1, 106-2, 106-M, where the plurality of local controllers 106-1, 106-2, 106-M are controlled by master controller 104.

As shown in FIG. 1, network layout 100 can include a plurality of APs 108 located throughout the floor plan associated with network layout 100. The plurality of APs 108 can each be associated with a respective local controller 106-1, 106-2, 106-M.

As used herein, an AP refers to a networking device that allows a client device to connect to a wired or wireless network. An AP can include a processor, memory, and input/output interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarch of persistent memory such as ROM, EPROM, and Flash memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

As used herein, a client device refers to a device including a processor, memory, and input/output interfaces for wired and/or wireless communication. A client device may include a laptop computer, a desktop computer, a mobile device, and/or other wireless devices, although examples of the disclosure are not limited to such devices. A mobile device may refer to devices that are (or may be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

Client device 103-1, 103-2, 103-N may connect to a plurality of local controllers 106-1, 106-2, 106-M via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

As shown in FIG. 1, network layout 100 can include master controller 104. Master controller 104 can include a processing resource and a memory resource 105 storing machine-readable instructions to cause the processing resource to upgrade controllers and/or APs in a computing network such as network layout 100 by creating a plurality of groups of APs 108 connected to a plurality of local controllers 106-1, 106-2, 106-M. For example, master controller 104 may create a plurality of groups of APs 108 in network layout 100. Creating the plurality of groups of APs 108 can allow a client device to maintain network connectivity during an upgrade process, as well as provide load balancing to the plurality of APs operating in network layout 100, as is further described herein.

Master controller 104 can create the plurality of groups of APs 108 based on a plurality of AP channels 110-1, 110-2, 110-3, 110-4, 110-5, 110-6. For example, as shown in FIG. 1, network layout 100 includes APs 108, each operating on an AP channel among channels 110-1, 110-2, 110-3, 110-4, 110-5, 110-6. As used herein, an AP channel refers to a specific wireless frequency range.

As shown in FIG. 1, APs 108 may operate on AP channels 110-1, 110-2, 110-3, 110-4, 110-5, 110-6, corresponding to AP channels 36, 38, 40, 42, 44, and 46, respectively. Master controller 104 can create groups of APs 108 based on the AP channel 110-1, 110-2, 110-3, 110-4, 110-5, 110-6 of APs 108-1 through 108-R. That is, APs 108-1, 108-5, 108-9, and 108-13 may be grouped based on those APs operating on channel 36. A similar grouping may be made for the remaining APs, as is further described in connection with FIG. 2.

Although the plurality of APs 108 are described as being grouped based on the operating channel, examples of the disclosure are not so limited. For example, the plurality of APs may be grouped based on groups of available AP channels. For instance, master controller 104 may determine that there are 24 available AP channels 110, and group the 24 available AP channels 110 into subgroups. In some examples, master controller 104 may determine the subgroups of AP channels 110 to include 3 channels, allowing for 8 different subgroups of AP channels 110. In some examples, master controller 104 may determine the subgroups of AP channels 110 to include 4 channels, allowing for 6 different subgroups of AP channels 110. In some examples, master controller 104 may determine subgroups of AP channels 110 to include subgroups of a varying number of channels, allowing for different sizes of subgroups of AP channels 110.

In an example involving subgroups of 4 AP channels 110, master controller 104 may select APs 108 operating on channels 1-4 as a first group. Accordingly, master controller 104 may select APs 108 operating on channels 5-8 as a second group, 9-12 as a third group, 13-16 as a fourth group, and so on until the plurality of APs 108 are all grouped.

As shown in FIG. 1, APs located in physical proximity to one another may not necessarily use the same AP channels 110. Creating groups by AP channel usage by master controller 104 can result in groups having APs 108 on the same channel or same subgroup of channels, but the APs 108 in the groups are not necessarily located in physical proximity to one another, as is further described in connection with FIG. 2.

Although the plurality of APs 108 are described as being grouped based on a plurality of AP channels 110, examples of the disclosure are not so limited. Master controller 104 can group the plurality of APs 108 based on radio-frequency (RF) coverage of the plurality of APs 108. For example, master controller 104 can create a plurality of groups of APs 108 such that each group of APs provides a minimum amount of RF coverage for client devices 103.

Master controller 104 may move a subset of the plurality of APs connected to a local controller 106-1 to a remaining plurality of local controllers 106-2, 106-M. For instance, prior to upgrading local controllers and/or APs, APs may be connected to local controller 106-1 that are not associated with a first group of APs. That is, AP 108-1, 108-2, 108-3, and 108-4 may be connected to local controller 106-1, but local controller 106-1 may be associated with a first group of APs that does not include APs 108-1, 108-2, 108-3, and 108-4. Therefore, master controller 104 can move APs 108-2, 108-3, and 108-4 from local controller 106-1 to local controllers 106-2, 106-M prior to upgrading local controller 106-1.

Master controller 104 can upgrade local controller 106-1. Upgrading the plurality of local controllers includes rebooting the plurality of local controllers and updating instructions of the plurality of local controllers. As used herein, instructions refer to machine-readable instructions. For example, during the upgrade process, master controller 104 can reboot local controller 106-1 and upgrade instructions of local controller 106-1. As used herein, reboot refers to a process in which a running computing system, such as in a controller, master controller, and/or an AP is restarted.

Master controller 104 can move APs associated with a group of the plurality of APs to local controller 106-1 in response to local controller 106-1 being upgraded. For example, a group of APs may include APs operating on AP channel 110-1 corresponding to AP channel 36, including APs 108-1, 108-5, 108-9, and 108-13. Master controller 104 can move the group of APs including APs 108-1, 108-5, 108-9, and 108-13 to local controller 106-1 in response to local controller 106-1 being upgraded.

Local controller 106-1, running upgraded instructions, can upgrade the group of APs associated with local controller 106-1. That is, local controller 106-1 can upgrade APs 108-1, 108-5, 108-9, and 108-13. Upgrading the APs associated with local controller 106-1 includes rebooting the APs associated with local controller 106-1 and upgrading instructions of the APs associated with local controller 106-1.

Although APs 108-1, 108-5, 108-9, and 108-13 are described as being moved to local controller 106-1 and then being upgraded, examples of the disclosure are not so limited. For example, master controller 104 can cause local controllers 106-2, 106-M to preload the group of APs (e.g., APs 108-1, 108-5, 108-9, and 108-13) with upgraded instructions. Master controller 104 can cause local controllers 106-2, 106-M to cause APs 108-1, 108-5, 108-9, and 108-13 to upgrade and connect to local controller 106-1. As used herein, preloading refers to loading upgraded instructions to an AP and/or a controller prior to upgrading the AP and/or the controller. Preloading the group of APs with upgraded instructions can reduce AP downtime during upgrades.

Figure 2:
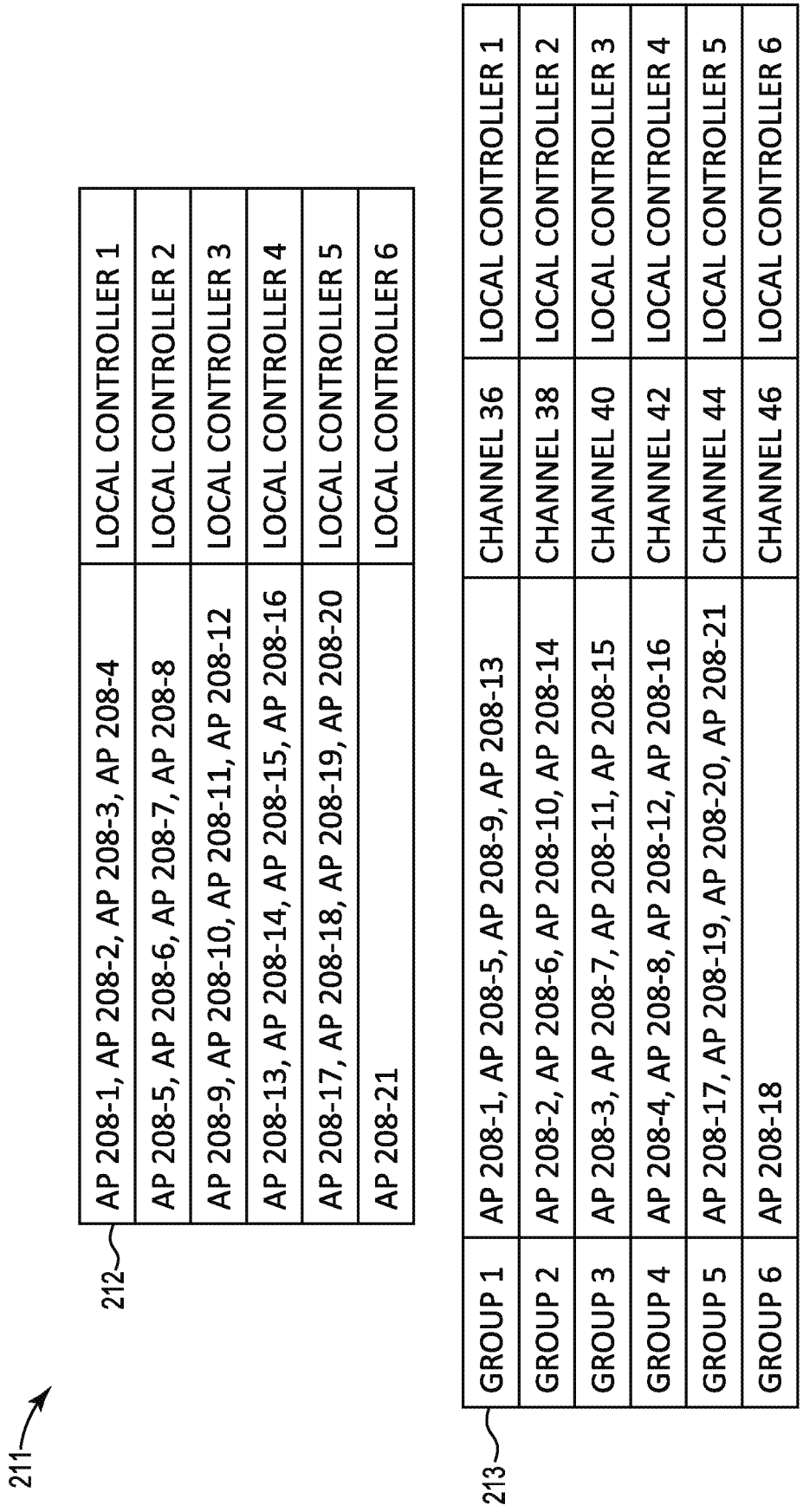
FIG. 2 illustrates example AP tables, consistent with the present disclosure.

FIG. 2 illustrates example AP tables 211 consistent with the present disclosure. AP table 212 illustrates an example AP association with local controllers prior to upgrading controllers and APs as described in connection with FIG. 1. Additionally, AP group table 213 illustrates an example grouping scheme by a master controller (e.g., master controller 104, described in connection with FIG. 1) utilizing the network layout described in connection with FIG. 1. As shown in FIG. 2, AP tables 211 can include APs 208-1 through 208-21, which can correspond to APs 108-1 through 108-R, previously described in connection with FIG. 1.

Prior to upgrading the plurality of local controllers and the plurality of APs, APs may be connected to local controllers not associated with their respective groups. For example, as shown in AP table 212, APs 208-1 through 208-4 may be connected to local controller 1, APs 208-5 through 208-8 may be connected to local controller 2, APs 208-9 through 208-12 may be connected to local controller 3, APs 208-13 through 208-16 may be connected to local controller 4, APs 208-17 through 208-20 may be connected to local controller 5, and AP 208-21 may be connected to local controller 6.

As shown in AP group table 213, the master controller can create a plurality of groups of APs connected to the plurality of local controllers. For instance, the master controller can create a plurality of groups of APs based on AP channel usage. That is, the master controller can create six groups corresponding to six AP channels; group 1 includes APs 208-1, 208-5, 208-9, and 208-13 utilizing AP channel 36; group 2 includes APs 208-2, 208-6, 208-10, and 208-14 utilizing AP channel 38; group 3 includes APs 208-3, 208-7, 208-11, and 208-15 utilizing AP channel 40; group 4 includes APs 208-4, 208-8, 208-12, and 208-16 utilizing AP channel 42; group 5 includes APs 208-17, 208-19, 208-20, and 208-21 utilizing AP channel 44; and group 6 includes AP 208-18 utilizing AP channel 46.

Although FIG. 2 illustrates a group table 213 as including six groups, examples of the disclosure are not so limited. In some examples, the master controller can group the plurality of APs in less than six groups. Less APs in each group may result in a longer upgrade time, but decrease the chance of network connectivity loss of client devices during an upgrade. In some examples, the master controller can group the plurality of APs in more than six groups. More APs in each group may result in a shorter upgrade time, but increase the chance of network connectivity loss of client devices during an upgrade.

The master controller can move a subset of the plurality of APs connected to a local controller 1 to a remaining plurality of local controllers. For example, the master controller can move APs 208-1 through 208-4 to local controllers 2-6. For instance, AP 208-1 may be moved to local controller 2, AP 208-2 may be moved to local controller 4, AP 208-3 may be moved to local controller 5, and AP 208-4 may be moved to local controller 6, although examples of the disclosure are not limited to the APs 208-1 through 208-4 being moved to local controllers 2, 4, 5, and 6, respectively.

The master controller can upgrade local controller 1. As described in connection with FIG. 1, instructions of local controller 1 may be upgraded by the master controller, including rebooting local controller 1 and upgrading the instructions of local controller 1.

The master controller can move APs associated with a first group of the plurality of APs to local controller 1. For example, the master controller can move APs 208-1, 208-5, 208-9, and 208-13 of group 1 to local controller 1.

Group 1, including APs 208-1, 208-5, 208-9, and 208-13 can be upgraded. As described in connection with FIG. 1, instructions of APs 208-1, 208-5, 208-9, and 208-13 may be upgraded, including rebooting APs 208-1, 208-5, 208-9, and 208-13 and upgrading the instructions of APs 208-1, 208-5, 208-9, and 208-13. APs 208-1, 208-5, 208-9, and 208-13 may be upgraded by local controller 1.

Although APs 208-1, 208-5, 208-9, and 208-13 are described as being moved to local controller 1 and then being upgraded, examples of the disclosure are not so limited. For example, the master controller can cause local controllers 2, 3, 4, and 5 to preload to the respective APs (e.g., APs 208-1, 208-5, 208-9, and 208-13) with upgraded instructions. The master controller can cause local controllers 2, 3, 4, and 5 to cause APs 108-1, 108-5, 108-9, and 108-13, respectively, to upgrade and connect to local controller 1.

In such an example, local controller 1, and APs 208-1, 208-5, 208-9, and 208-13 are now upgraded. Local controllers 2-6 are not upgraded. APs 208-6, 208-7, and 208-8 are connected to local controller 2 and are not upgraded; APs 208-10, 208-11, and 208-12 are connected to local controller 3 and are not upgraded; APs 208-2, 208-14, 208-15, and 208-16 are connected to local controller 4 and are not upgraded; APs 208-3, 208-17, 208-18, 208-19, and 208-20 are connected to local controller 5 and are not upgraded; and APs 208-4 and 208-21 are connected to local controller 6 and are not upgraded.

The master controller can upgrade local controller 2. APs 208-6, 208-7, and 208-8 can failover to the remaining plurality of local controllers, or master controller can move APs 208-6, 208-7, and 208-8 to the remaining plurality of local controllers. As used herein, failover refers to a method of protecting computing systems from failure, in which other equipment automatically takes over when equipment, such as a controller or AP, fails. For instance, AP 208-6 may be moved to local controller 3, AP 208-7 may be moved to local controller 4, and AP 208-8 may be moved to local controller 6. Once APs 208-6, 208-7, and 208-8 are moved from local controller 2, the master controller can upgrade local controller 2, including rebooting local controller 2 and upgrading the instructions of local controller 2.

Although described as APs failing over to a remaining plurality of non-upgraded local controllers or being moved by the master controller to a remaining plurality of non-upgraded local controllers, examples of the disclosure are not so limited. For example, APs may failover or be moved by the master controller to upgraded local controllers.

The master controller can move APs associated with a second group of the plurality of APs to local controller 2. For example, the master controller can move APs 208-2, 208-6, 208-10, and 208-14 of group 2 to local controller 2.

Group 2, including APs 208-2, 208-6, 208-10, and 208-14 can be upgraded. As described in connection with FIG. 1, instructions of APs 208-2, 208-6, 208-10, and 208-14 may be upgraded, including rebooting APs 208-2, 208-6, 208-10, and 208-14 and upgrading the instructions of APs 208-2, 208-6, 208-10, and 208-14. APs 208-2, 208-6, 208-10, and 208-14 may be upgraded by local controller 2.

In such an example, local controllers 1 and 2, and APs 208-1, 208-2, 208-5, 208-6, 208-9, 208-10, 208-13, and 208-14 are now upgraded. Local controllers 3-6 are not upgraded. APs 208-11 and 208-12 are connected to local controller 3 and are not upgraded; APs 208-7, 208-15, and 208-16 are connected to local controller 4 and are not upgraded; APs 208-3, 208-17, 208-18, 208-19, and 208-20 are connected to local controller 5 and are not upgraded; and APs 208-4, 208-8, and 208-21 are connected to local controller 6 and are not upgraded.

The master controller can upgrade local controller 3. APs 208-11 and 208-12 can failover to the remaining plurality of local controllers, or master controller can move APs 208-11 and 208-12 to the remaining plurality of local controllers. For instance, AP 208-11 may be moved to local controller 4, and AP 208-12 may be moved to local controller 5. Once APs 208-11 and 208-12 are moved from local controller 3, the master controller can upgrade local controller 3, including rebooting local controller 3 and upgrading the instructions of local controller 3.

The master controller can move APs associated with a third group of the plurality of APs to local controller 3. For example, the master controller can move APs 208-3, 208-7, 208-11, and 208-15 of group 3 to local controller 3.

Group 3, including APs 208-3, 208-7, 208-11, and 208-15 can be upgraded. As described in connection with FIG. 1, instructions of APs 208-3, 208-7, 208-11, and 208-15 may be upgraded, including rebooting APs 208-3, 208-7, 208-11, and 208-15 and upgrading the instructions of APs 208-3; 208-7, 208-11, and 208-15. APs 208-3, 208-7, 208-11, and 208-15 may be upgraded by local controller 3.

In such an example, local controllers 1-3, and APs 208-1 through 208-3, 208-5 through 208-7, 208-9 through 208-11, and 208-13 through 208-15 are now upgraded. Local controllers 4-6 are not upgraded. AP 208-16 is connected to local controller 4 and is not upgraded; APs 208-12, 208-17, 208-18, 208-19, and 208-20 are connected to local controller 5 and are not upgraded; and APs 208-4; 208-8, and 208-21 are connected to local controller 6 and are not upgraded.

The master controller can upgrade local controller 4. AP 208-16 can failover to the remaining plurality of local controllers, or master controller can move AP 208-16 to the remaining plurality of local controllers. For instance, AP 208-16 may be moved to local controller 6. Once AP 208-16 is moved from local controller 4, the master controller can upgrade local controller 4, including rebooting local controller 4 and upgrading the instructions of local controller 4.

The master controller can move APs associated with a fourth group of the plurality of APs to local controller 4. For example, the master controller can move APs 208-4, 208-8; 208-12; and 208-16 of group 4 to local controller 4.

Group 4, including APs 208-4, 208-8, 208-12, and 208-16 can be upgraded. As described in connection with FIG. 1;

instructions of APs 208-4; 208-8, 208-12, and 208-16 may be upgraded, including rebooting APs 208-4, 208-8, 208-12, and 208-16 and upgrading the instructions of APs 208-4, 208-8; 208-12; and 208-16. APs 208-4, 208-8, 208-12, and 208-16 may be upgraded by local controller 4.

In such an example, local controllers 1-4, and APs 208-1 through 208-16 are now upgraded. Local controllers 5-6 are not upgraded. APs 208-17, 208-18, 208-19, and 208-20 are connected to local controller 5 and are not upgraded; and AP 208-21 is connected to local controller 6 and is not upgraded.

The master controller can upgrade local controller 5. APs 208-17, 208-18, 208-19, and 208-20 can failover to the remaining plurality of local controllers, or master controller can move APs 208-17, 208-18, 208-19, and 208-20 to the remaining plurality of local controllers. For instance, APs 208-17, 208-18, 208-19, and 208-20 may be moved to local controller 6. Once APs 208-17, 208-18, 208-19, and 208-20 are moved from local controller 5, the master controller can upgrade local controller 5, including rebooting local controller 5 and upgrading the instructions of local controller 5.

The master controller can move APs associated with a fifth group of the plurality of APs to local controller 5. For example, the master controller can move APs 208-17, 208-19, 208-20, and 208-21 of group 5 to local controller 5.

Group 5, including APs 208-17, 208-19, 208-20, and 208-21 can be upgraded. As described in connection with FIG. 1, instructions of APs 208-17, 208-19, 208-20, and 208-21 may be upgraded, including rebooting APs 208-17, 208-19, 208-20, and 208-21 and upgrading the instructions of APs 208-17, 208-19, 208-20, and 208-21. APs 208-17, 208-19, 208-20, and 208-21 may be upgraded by local controller 5.

In such an example, local controllers 1-5, and APs 208-1 through 208-17, and 208-19 through 208-21 are now upgraded. Local controller 6 is not upgraded. AP 208-18 is connected to local controller 6 and is not upgraded.

The master controller can move APs associated with a last group of the plurality of APs to the plurality of local controllers other than a last local controller. For example, the master controller can move AP 208-18 to local controllers 1.

Although AP 208-18 is described as being moved to local controller 1, examples of the disclosure are not so limited. For example, the master controller can move AP 208-18 to any one of local controllers 1-5.

Local controller 1 can upgrade the last group of the plurality of APs. For example, local controller 1 can upgrade AP 208-18, including rebooting AP 208-18 and upgrading the instructions of AP 208-18. As used herein, the last group of the plurality of APs refers to a last group of APs among the plurality of groups of APs that has not been upgraded. That is, the last group of APs among the plurality of groups of APs is the last group of APs to be upgraded.

Although local controller 1 is described as upgrading the last group of the plurality of APs, examples of the disclosure are not so limited. For example, any one of the local controllers 1-5 may upgrade the last group of the plurality of APs in response to AP 208-18 being moved to any one of the respective local controllers 105.

The master controller can upgrade the last local controller. For example, the master controller can upgrade local controller 6, including rebooting local controller 6 and upgrading the instructions of local controller 6. As used herein, the last local controller refers to a local controller among the plurality of local controllers that has not been upgraded. That is, the last local controller among the plurality of local controllers is the last local controller to be upgraded.

The master controller can move APs associated with the last group of the plurality of APs to the last local controller. For example, the master controller can move group 6, including AP 208-18, to local controller 6.

As described above, each group of the plurality of APs is moved to an associated local controller among the plurality of local controllers. For example, group 1 is moved to local controller 1, group 2 is moved to local controller 2, group 3 is moved to local controller 3, group 4 is moved to local controller 4, group 5 is moved to local controller 5, and group 6 is moved to local controller 6.

Although shown in FIG. 2 and described above as upgrading six groups of APs and six local controllers, examples of the disclosure are not so limited. In some examples, more than six groups of APs and more than six local controllers can be upgraded. In some examples, less than six groups of APs and less than six local controllers can be upgraded, as is further described with respect to FIG. 4.

The plurality of local controllers may be upgraded via a failover mechanism. As used herein, the term mechanism generally refers to a component of a system or device to serve one or more functions, including but not limited to, software components, electronic components, electrical components, mechanical components, electro-mechanical components, etc. For example, a subgroup of local controllers of the plurality of local controllers may compensate for a local control that is out of service while being upgraded.

The APs associated with the group of the plurality of APs are upgraded via a failover mechanism. For example, a subgroup of APs of the plurality of APs may compensate for an AP that is out of service while being upgraded.

Upgrading local controllers and APs by group can be periodically used to upgrade instructions of local controllers and/or APs without interrupting wireless network service to client devices connected to the APs. This can avoid scheduling maintenance windows in order to upgrade local controllers and/or APs, which may take several minutes to hours. Further, the method can provide load balancing of APs by ensuring an even distribution of APs across the plurality of local controllers.

Figure 3:
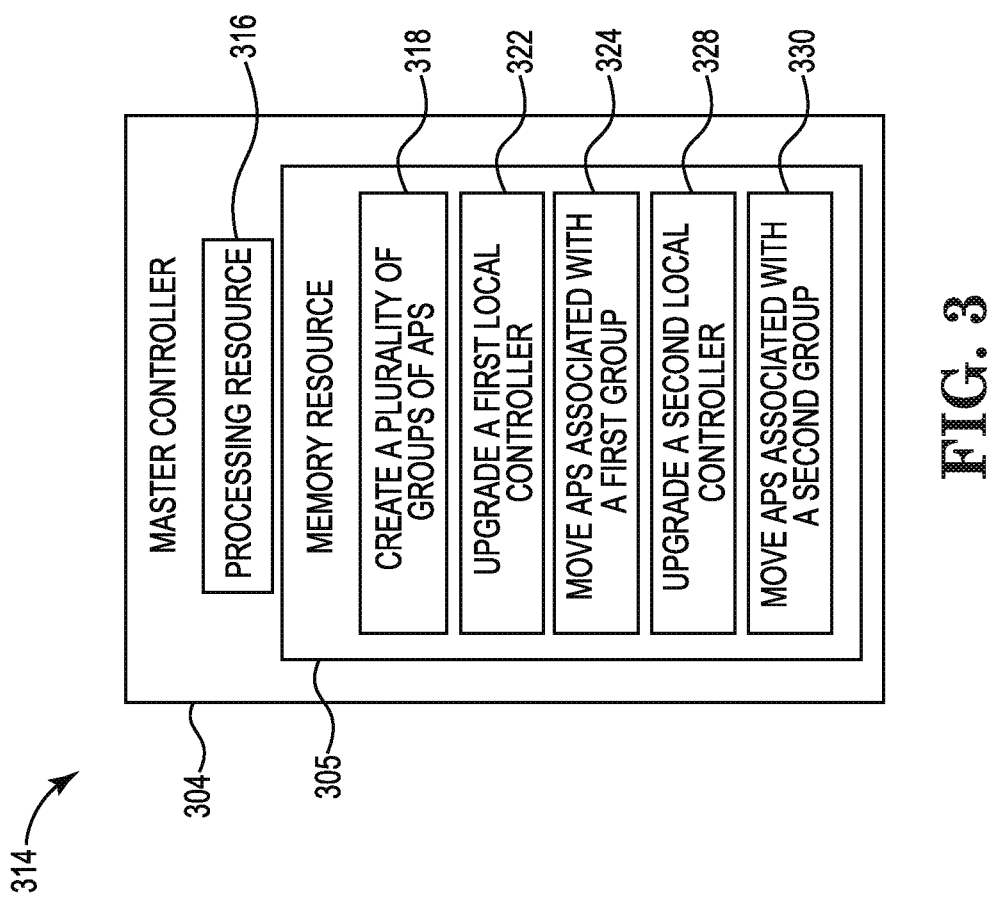
FIG. 3 is a block diagram of an example master controller to upgrade controllers and APs by group, consistent with the present disclosure.

FIG. 3 is a block diagram 314 of an example master controller 304 to upgrade controllers and APs by group, consistent with the present disclosure. As described herein, the master controller 304 may perform a number of functions related to upgrading local controllers and APs by group. Although not illustrated in FIG. 3, the master controller 304 may include a processor and a machine-readable storage medium. Although the following descriptions refer to a single processor and a single machine-readable storage medium, the descriptions may also apply to a system with multiple processors and multiple machine-readable storage mediums. In such examples, the master controller 304 may be distributed across multiple machine-readable storage mediums and the master controller 304 may be distributed across multiple processors. Put another way, the instructions executed by the master controller 304 may be stored across multiple machine-readable storage mediums and executed across multiple processors, such as in a distributed or virtual computing environment.

As illustrated in FIG. 3, the master controller 304 may comprise a processing resource 316, and a memory resource 305 storing machine-readable instructions to cause the processing resource 316 to perform a number of operations relating to upgrading local controllers and APs by group. That is, using the processing resource 316 and the memory resource 305, the master controller 304 may upgrade local controllers and APs by group, such as the APs and local controllers illustrated in FIG. 1, among other operations. Processing resource 316 may be a central processing unit (CPU), microprocessor, and/or other hardware device suitable for retrieval and execution of instructions stored in memory resource 305.

The master controller 304 may include instructions stored in the memory resource 305 and executable by the processing resource 318 to create a plurality of groups of APs connected to a plurality of local controllers. That is, the master controller 304 may include instructions 318 stored in the memory resource 305 and executable by the processing resource 316 to group the plurality of APs based on a plurality of AP channels.

The master controller 304 may include instructions 322 stored in the memory resource 305 and executable by the processing resource 316 to upgrade the first local controller. As described in relation to FIGS. 1 and 2, upgrading the first local controller may include moving a subset of the plurality of APs connected to the first local controller to a remaining plurality of local controllers. The master controller 304 may include instructions 324 to move APs associated with a first group among the plurality of groups of APs to the first local controller, and upgrade the APs associated with the first group.

The master controller 304 may include instructions 328 to upgrade a second local controller, instructions 330 to move APs associated with a second group among the plurality of groups of APs to the second local controller, and upgrade the APs associated with the second group.

In this manner, the master controller 304 may upgrade the plurality of APs and the plurality of local controllers without interrupting wireless network service to client devices that may be connected to the plurality of APs. Further, the master controller 304 can load balance APs across the plurality of local controllers.

Figure 4:
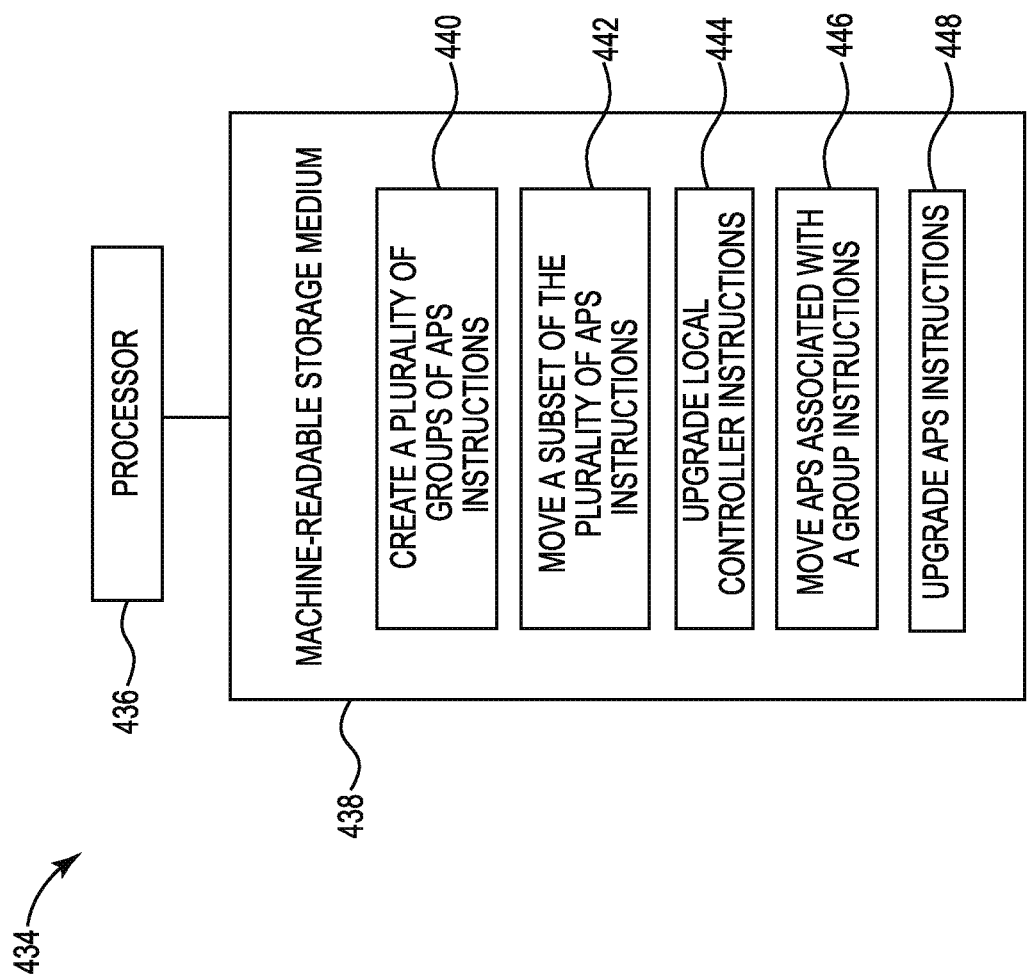
FIG. 4 is a block diagram of an example system, consistent with the present disclosure.

FIG. 4 is a block diagram of an example system 434, consistent with the present disclosure. In the example of FIG. 4, system 434 includes a processor 436 and a machine-readable storage medium 438. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 436 may be a central processing unit (CPU), microprocessor, and/or other hardware device suitable for retrieval and execution of instructions stored in machine-readable storage medium 438. In the particular example shown in FIG. 4, processor 436 may receive, determine, and send instructions 440, 442, 444, 446, and 448. As an alternative or in addition to retrieving and executing instructions, processor 436 may include an electronic circuit comprising a number of electronic components for performing the operations of the instructions in machine-readable storage medium 438. With respect to the executable instruction representations or boxes described and shown herein, it should be understood that part or all of the executable instructions and/or electronic circuits included within one box may be included in a different box shown in the figures or in a different box not shown.

Machine-readable storage medium 438 may be any electronic, magnetic, optical, or other physical storage device that stores executable instructions. Thus, machine-readable storage medium 438 may be, for example, Random Access Memory (RAM), an Electrically-Erasable Programmable Read-Only Memory (EEPROM), a storage drive, an optical disc, and the like. The executable instructions may be "installed" on the system 434 illustrated in FIG. 4. Machine-readable storage medium 438 may be a portable, external or remote storage medium, for example, that allows the system 434 to download the instructions from the portable/external/remote storage medium. In this situation, the executable instructions may be part of an "installation package". As described herein, machine-readable storage medium 438 may be encoded with executable instructions to upgrade controllers and APs by group.

Create a plurality of groups of APs instructions 440, when executed by a processor such as processor 436, may cause system 434 to create a plurality of groups of APs that are connected to a first and a second local controller. The instructions to group the plurality of APs may include instructions to create the plurality of groups of APs based on a plurality of AP channels.

Move a subset of the plurality of APs instructions 442, when executed by a processor such as processor 436, may cause system 434 to move a subset of the plurality of APs connected to the first local controller to the second local controller. The APs connected to the first local controller may not all be associated with a particular grouping of APs, and may be moved prior to upgrading the first local controller.

Upgrade local controller instructions 444, when executed by a processor such as processor 436, may cause system 434 to upgrade the first local controller, Upgrading the first local controller may include rebooting the first local controller and upgrading instructions of the first local controller.

Move APs associated with a group instructions 446, when executed by a processor such as processor 436, may cause system 434 to move APs associated with a group of the plurality of APs to the first local controller. For example, a group of APs created by create a plurality of groups of APs instructions 440 may be moved to the first local controller.

Upgrade APs instructions 448, when executed by a processor such as processor 436, may cause system 434 to upgrade the APs associated with the group of the first local controller. Upgrading the APs associated with the group of the first local controller may include rebooting the group of APs and updating instructions of the group of APs.

FIG. 5 illustrates an example method 550 consistent with the present disclosure. At 552, the method 550 may include creating a plurality of groups of APs connected to a plurality of local controllers. As described in connection with FIGS. 1-4, the plurality of APs can be grouped by a master controller based on a plurality of AP channels, RF coverage, and/or other methods.

The method 550 may include upgrading the plurality of local controllers and the plurality of groups of APs. Upgrading the plurality of local controllers and the plurality of groups of APs can be performed according to a predetermined upgrade sequence. For instance, the predetermined upgrade sequence may be based on maintaining RF coverage for client devices connected to the plurality of APs.

At 554, the method 550 may include moving a subset of the plurality of APs connected to a local controller to a different local controller. For example, APs connected to a first local controller may be moved from the first local controller to a second local controller.

At 556, the method 550 may include upgrading, by the master controller, the local controller. As described in connection with FIGS. 1 and 2, instructions of the local controller may be upgraded by rebooting the local controller and upgrading the instructions of the local controller.

At 558, the method 550 may include moving, by the master controller, a group of APs among the plurality of groups of APs to the local controller. The group of APs may be moved from the different local controller. The local controller can upgrade the group of APs, including rebooting the group of APs and upgrading the instructions of the group of APs.

At 560, the method 550 may include moving, by the master controller, a different subset of the plurality of APs a different local controller to the local controller. The local controller can upgrade the different subset of APs, including rebooting the different subset of APs and upgrading the instructions of the different subset of APs.

At 562, the method 550 may include upgrading, by the master controller, the different local controller. That is, the master controller can reboot the different local controller and upgrade the instructions of the different local controller. The master controller can move different group among the plurality of groups of APs to the different local controller.

Using method 550, the local controller and the different local controller may be upgraded, as well as the group and the different group of APs. Method 550 can upgrade the local controllers and the groups of APs without interrupting wireless network service to client devices that may be connected to the plurality of APs, as well as provide a load balance of APs across the local controllers.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense. As used herein, the designator "M", "N", "P", and/or "R", particularly with respect to reference numerals in the drawings, indicates that a plurality of the particular feature so designated can be included with examples of the present disclosure. The designators can represent the same or different numbers of the particular features. Further, as used herein, "a plurality of" an element and/or feature can refer to more than one of such elements and/or features.

What is claimed:

1. A master controller comprising:
   a processing resource; and
   a memory resource storing machine-readable instructions to cause the processing resource to:
   create a plurality of groups of access points associated with a first and a second local controller based on a plurality of channels providing a minimum amount of service coverage for client devices thereon of the plurality of groups of access points relative to either of the first local controller and the second local controller;
   move a first subset of access points connected to the first local controller to the second local controller, wherein the first local controller is not associated with the first subset of access points connected to the first local controller among the plurality of groups of access points;
   upgrade the first local controller;
   move, in response to the first local controller being upgraded, access points associated with the first subset of access points among the plurality of groups of access points to the first local controller; and
   upgrade, with the first local controller, the access points associated with the first subset of access points, when the first local controller has been upgraded.

2. The master controller of claim 1, including instructions to cause the processing resource to create the plurality of groups of access points based on a plurality of access point channels.

3. The master controller of claim 1, including instructions to cause the processing resource to create the plurality of groups of access points based on radio-frequency (RF) coverage of the access points.

4. The master controller of claim 1, wherein each group of the plurality of groups of access points is moved to an associated local controller among the first and second local controllers.

5. The master controller of claim 1, wherein the first and second local controllers are upgraded via a failover mechanism.

6. The master controller of claim 1, wherein the access points associated with the group of access points are upgraded via a failover mechanism.

7. A non-transitory machine-readable medium storing instructions executable by a processing resource to:
   create a plurality of groups of access points connected to a plurality of local controllers based on a common channel used by access points within the plurality of groups of access points relative to a local controller in the plurality of local controllers;
   move access points connected to a first local controller to a second local controller, wherein the first local controller is associated with a first subset of access points connected to the first local controller;
   upgrade the first local controller;
   move access points associated with the first controller among the plurality of groups of access points to the first local controller and upgrade the access points associated with the first local controller when the first local controller has been upgraded;
   move access points connected to the second controller among the plurality of groups of access points to one or more other local controllers, the one or more other local controllers including the first controller;
   upgrade the second local controller; and
   upgrade the access points associated with the second local controller when the second local controller has been upgraded, wherein the upgrading of the first and second local controllers and the upgrading of the access points occurs without interrupting wireless network service to client devices operatively connected to each of the common channels.

8. The non-transitory machine-readable medium of claim 7, comprising instructions to:
move access points associated with a last group among the plurality of groups of access points to the plurality of local controllers other than a last local controller; and
upgrade, by the plurality of local controllers other than the last local controller, the last group of the plurality of access points.

9. The non-transitory machine-readable medium of claim 8, comprising instructions to:
upgrade the last local controller; and
move multiple access points associated with the last group to the last local controller.

10. The non-transitory machine-readable medium of claim 7, wherein multiple access points associated with the first group are upgraded by the first local controller.

11. The non-transitory machine-readable medium of claim 7, wherein multiple access points associated with the second group are upgraded by the second local controller.

12. A method, comprising:
creating, by a master controller, a plurality of groups of access points connected to a plurality of local controllers, the access points within each of the plurality of groups of access points being operative on a common channel relative to a local controller in the plurality of local controllers;
moving a subset of access points connected to a local controller to a different local controller;
upgrading the local controller;
moving the subset of access points to the local controller and upgrading, by the local controller, the subset of access points;
moving a different subset of access points connected to the different local controller to the local controller; and
upgrading the different local controller, wherein the upgrading of the local controller and the different local controller, and the upgrading of the subset of access points moved to the local controller occurs without interrupting wireless network service to client devices operatively connected to each of the common channels.

13. The method of claim 12, including:
upgrading the different subset of access points by the local controller; and
moving a different group among the plurality of groups of access points to the different local controller.

14. The method of claim 12, wherein upgrading the plurality of local controllers includes rebooting the plurality of local controllers and updating instructions of the plurality of local controllers.

15. The method of claim 12, wherein upgrading the plurality of access points includes rebooting the plurality of access points and updating instructions of the plurality of access points.

* * * * *